(12) United States Patent
Matas et al.

(10) Patent No.: US 10,015,121 B2
(45) Date of Patent: *Jul. 3, 2018

(54) SMART POSITIONING OF CHAT HEADS

(71) Applicant: Facebook, Inc., Menlo Park, CA (US)

(72) Inventors: Michael Matas, San Francisco, CA (US); Brandon Marshall Walkin, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,672

(22) Filed: Jul. 18, 2016

(65) Prior Publication Data

US 2016/0330152 A1   Nov. 10, 2016

Related U.S. Application Data

(63) Continuation of application No. 14/051,326, filed on Oct. 10, 2013, now Pat. No. 9,424,558.

(51) Int. Cl.
  *G06F 15/00* (2006.01)
  *G06F 13/00* (2006.01)
  (Continued)

(52) U.S. Cl.
  CPC ........ *H04L 51/046* (2013.01); *G06F 3/04842* (2013.01); *G06Q 10/107* (2013.01);
  (Continued)

(58) Field of Classification Search
  CPC .............................. G06F 15/00; G06Q 10/107
  (Continued)

(56) References Cited

U.S. PATENT DOCUMENTS

2010/0229106 A1   9/2010   Lee
2010/0251153 A1   9/2010   Sangiovanni
(Continued)

FOREIGN PATENT DOCUMENTS

JP   2011-199450   10/2011
JP   2012-058838   3/2012
(Continued)

OTHER PUBLICATIONS

International Search Report and Written Opinion for International Application PCT/US2014/059858, dated Dec. 29, 2014.
(Continued)

*Primary Examiner* — Kevin Nguyen
(74) *Attorney, Agent, or Firm* — Baker Botts L.L.P.

(57) ABSTRACT

In particular embodiments, a client computing device of a user provides for presentation a user interface that includes one or more components. The client computing device may receive an indication of a message to the user. The client computing device may automatically modify the user interface to accommodate presentation of an interactive element associated with the message. The client computing device may modify the user interface at least in part by automatically modifying one or more of the components. The client computing device may automatically provide for presentation the user interface as modified and the interactive element associated with the message.

20 Claims, 16 Drawing Sheets

(51) Int. Cl.
| | | |
|---|---|---|
| *H04L 12/58* | (2006.01) | |
| *G06Q 10/10* | (2012.01) | |
| *G06F 3/0484* | (2013.01) | |
| *H04L 29/08* | (2006.01) | |
| *H04W 4/14* | (2009.01) | |
| *H04W 88/02* | (2009.01) | |

(52) U.S. Cl.
CPC .............. *H04L 51/32* (2013.01); *H04L 67/02* (2013.01); *H04L 67/306* (2013.01); *H04W 4/14* (2013.01); *H04W 88/02* (2013.01)

(58) Field of Classification Search
USPC .......................... 715/769, 810, 835, 757, 864
See application file for complete search history.

(56) References Cited

U.S. PATENT DOCUMENTS

| | | | |
|---|---|---|---|
| 2011/0227951 A1 | 9/2011 | Kubo et al. | |
| 2011/0314390 A1 | 12/2011 | Park | |
| 2012/0056898 A1 | 3/2012 | Tsurumi et al. | |
| 2012/0124477 A1 | 5/2012 | Edgar | |
| 2012/0210256 A1 | 8/2012 | Zhang | |
| 2013/0033421 A1 | 2/2013 | Lencic | |
| 2014/0358970 A1 | 12/2014 | Morris | |
| 2014/0359456 A1* | 12/2014 | Thiele ................... | H04W 4/001 715/735 |

FOREIGN PATENT DOCUMENTS

| | | |
|---|---|---|
| KR | 10-2010-0109499 | 10/2010 |
| KR | 10-2013-00999239 | 9/2013 |
| WO | WO 2005-069111 A1 | 7/2005 |

OTHER PUBLICATIONS

Australian Patent Examination Report No. 1 issued in corresponding Australian patent application, dated Nov. 4, 2016.
Notification of Reasons for Rejection issued in corresponding Japanese Application No. 2016-521725, dated Dec. 6, 2016.
Notification of Preliminary Rejection issued in corresponding Korean Application No. 10-2016-7012101, dated Dec. 5, 2016.
Decision of Rejection issued in corresponding Japanese Application No. 2016-521725 (with Translation), dated Sep. 5, 2017.
Notice of Preliminary Rejection issued in corresponding Korean Application No. 10-2016-7012101, dated Jun. 23, 2017.
Notice of Preliminary Rejection issued in corresponding Korean Application No. 2016-7012101 dated Oct. 11, 2017 (with Translation).
Notification of Defects in Israeli Patent Application No. 254985 (w/translation), dated Feb. 8, 2018.
Korean Notice of Final Rejection, dated May 9, 2018.

* cited by examiner

SMART POSITIONING OF CHAT HEADS

RELATED APPLICATION(S)

This application is a continuation under 35 U.S.C. § 120 of U.S. patent application Ser. No. 14/051,326, filed 10 Oct. 2013, which is incorporated herein by reference.

TECHNICAL FIELD

This disclosure generally relates to a user interface.

BACKGROUND

A user interface (UI), in the industrial design field of human-machine interaction, is the space where interactions between humans and machines occur. The goal of the interactions between a human, often referred to as a "user", and a machine at the user interface is the user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands.

SUMMARY OF PARTICULAR EMBODIMENTS

In particular embodiments, a client computing device of a user presents a user interface that includes a plurality of components. The components may, for example, include a news feed story, an image, text, an interactive element, or a sub-component. The client computing device may receive an indication of a message to the user. An interactive element may, for example, be presented to the user to indicate that the user has a message and may be presented to the user in a persistent fashion in the user interface.

The client computing device may automatically modify the user interface to accommodate presentation of the interactive element associated with the message by, for example, automatically modifying one or more of the components. In particular embodiments, modifying a component may include resizing the component, removing the component from presentation, providing the component for presentation, repositioning the component, or rearranging the component.

DESCRIPTION OF EXAMPLE EMBODIMENTS

A user interface (UI) may be incorporated into any type of software application, including, for example, a desktop application, mobile application, or web-based application, to enable users to interact with and control the application. A graphical user interface (GUI) is a type of user interface that enables users to interact with software applications through multimedia objects, including, for example, icons, buttons, menus, images, video, or audios.

Figure 1:
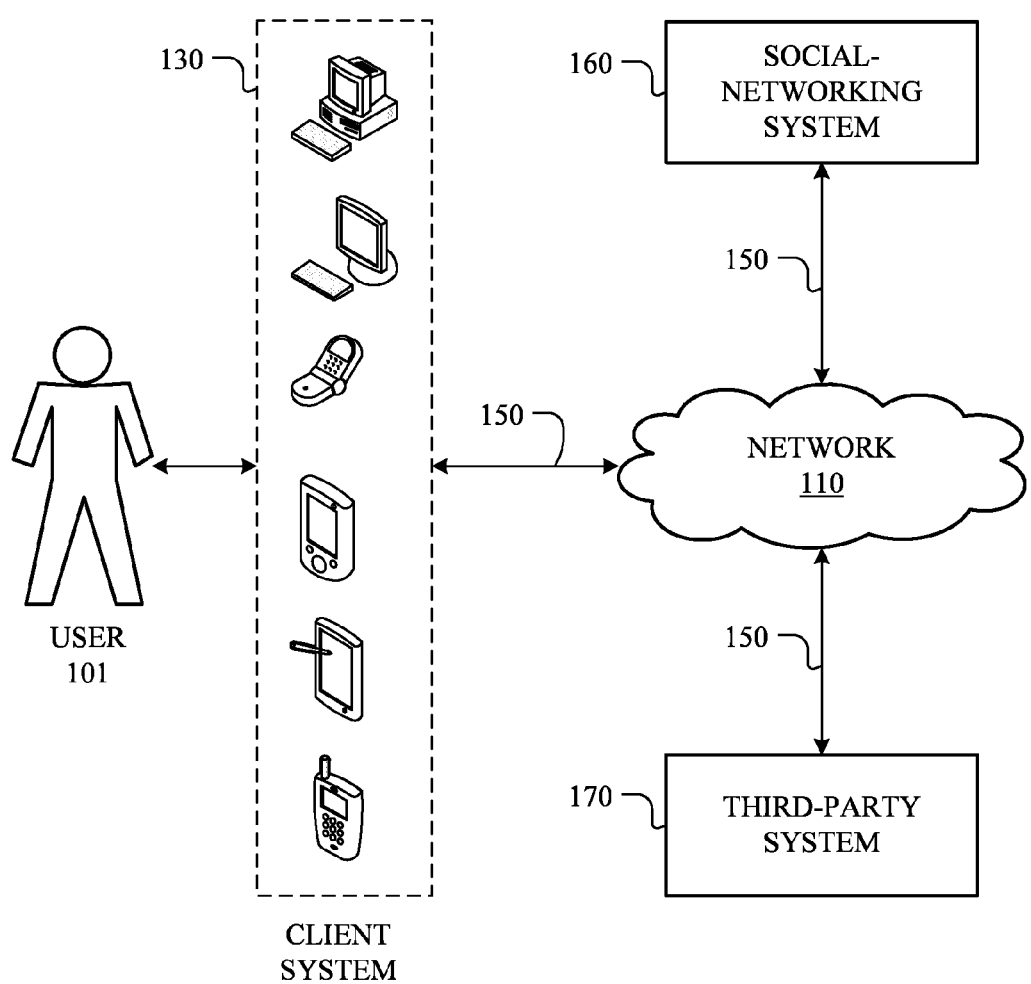
FIG. 1 illustrates an example network environment associated with a social-networking system.

In particular embodiments, a software application may be associated with a social-networking system. FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host various third-party software applications (e.g., web-based applications). Third-party system 170 may generate, store, receive, and transmit various types of data, such as, for example, texts, images, videos, or audios. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, a television, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, data (e.g., data representing various types of information or content) may be sent between servers associated with social-networking system 160 and individual client systems 130 via network 110. When two electronic devices (e.g., a server and a client) are connected to a network (e.g., a computer or communications network, such as network 110), data may be transmitted between the two devices over the network using one or more suitable network protocols. A network may include any number of sub-networks. By transmitting data between the two devices, the two devices may communicate with each other.

In network communications, there are two ways to send a communication (i.e., data) from one device to another device: push and pull. With push technology, the request for the communication transaction is initiated by the sending device. That is, the sending device "pushes" the communication, so to speak, to the receiving device. In this case, the sending device may be considered the active party and the receiving device may be considered the passive party in the transaction. In contrast, with pull technology, the request for the communication transaction is initiated by the receiving device. That is, the receiving device "pulls" the communication, so to speak, from the sending device. In this case, the sending device may be considered the passive party and the receiving device may be considered the active party in the transaction. In particular embodiments, a server associated with social-networking system 160 may push data to a client system 130. A communication pushed from a server to a client may be referred to as a "push notification". Similarly, a client system 130 may push data to a server associated with social-networking system 160.

In particular embodiments, a client system 130 may be a mobile electronic or computing device. A mobile electronic device—such as a Smartphone, tablet computer, or laptop computer—may include functionality for determining its location, direction, or orientation, such as a GPS receiver, compass, or gyroscope. Such a mobile device may also include functionality for wireless communication, such as BLUETOOTH communication, near-field communication (NFC), or infrared (IR) communication or communication with wireless local area networks (WLANs) or cellular-telephone network. Such a mobile device may also include one or more cameras, scanners, touch screens, microphones, or speakers. Mobile electronic devices may also execute software applications, such as games, web browsers, or social-networking applications. With social-networking applications, users may connect, communicate, and share information with other users in their social networks.

Figure 2A:
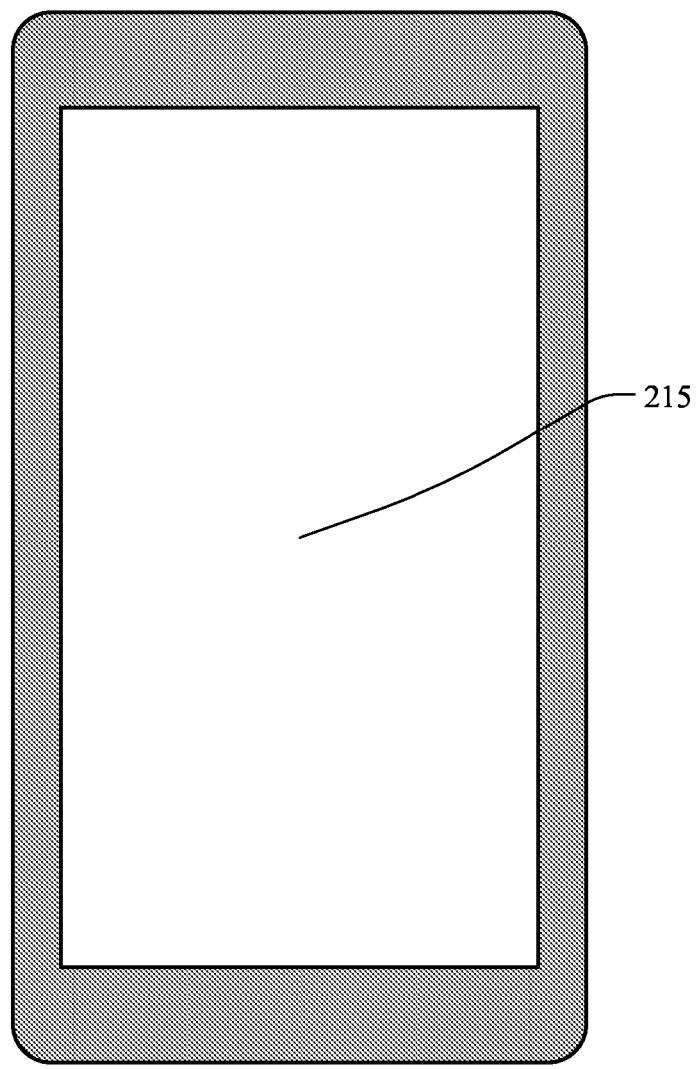
FIGS. 2A and 2B illustrate two example mobile electronic devices.

In particular embodiments, a mobile electronic device (e.g., Smartphone or tablet computer) may include a touch screen capable of receiving touch input. FIG. 2A illustrates an example mobile electronic device 210 (e.g., a Smartphone) having a touch screen 215. Touch screen 215 may incorporate one or more touch sensors and a touch-sensor controller for detecting the presence and location of a touch (e.g., from a user's finger) or the proximity of an object (e.g., a stylus). In particular embodiments, a specific touch detected via touch screen 215 may result in a touch input event.

Figure 2B:
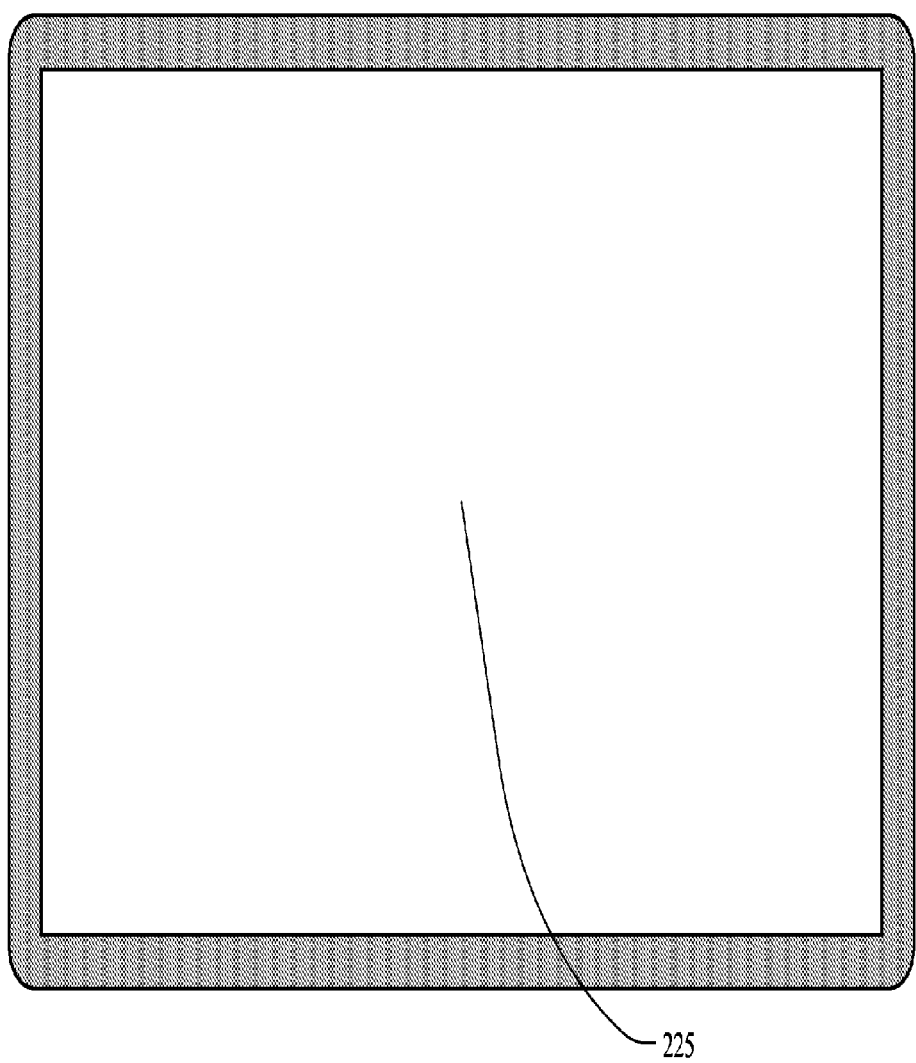

Different mobile electronic devices may have different designs. As a result, the size, shape, or aspect ration of the touch screens of different mobile devices may differ. FIG. 2B illustrates another example mobile electronic device 220 (e.g., a tablet computer) having a touch screen 225. Similarly, touch screen 225 may incorporate one or more touch sensors and a touch-sensor controller for detecting the presence and location of a touch (e.g., from a user's finger) or the proximity of an object (e.g., a stylus). A specific touch detected via touch screen 225 may result in a touch input event. However, since mobile electronic devices 210 and 220 are two different types of devices, their respective touch screen 215 and 225 have different sizes and aspect ratios.

There may be various types of touches or gestures, such as single tap, double tap, short press, long press, slide, swipe, flip, pinch open, or pinch close, corresponding to various types of touch input events. Different touch input events may result in different responses and this disclosure contemplates any applicable gesture.

Social-networking system 160 may store various types of data including, for example, user data, application data, or social data. In particular embodiments, such data may be stored in a graph having any number of nodes and edges, where each edge connects two nodes. The graph is often referred to as a "social graph" or "open graph" as it contains, among others, social information.

Figure 3:
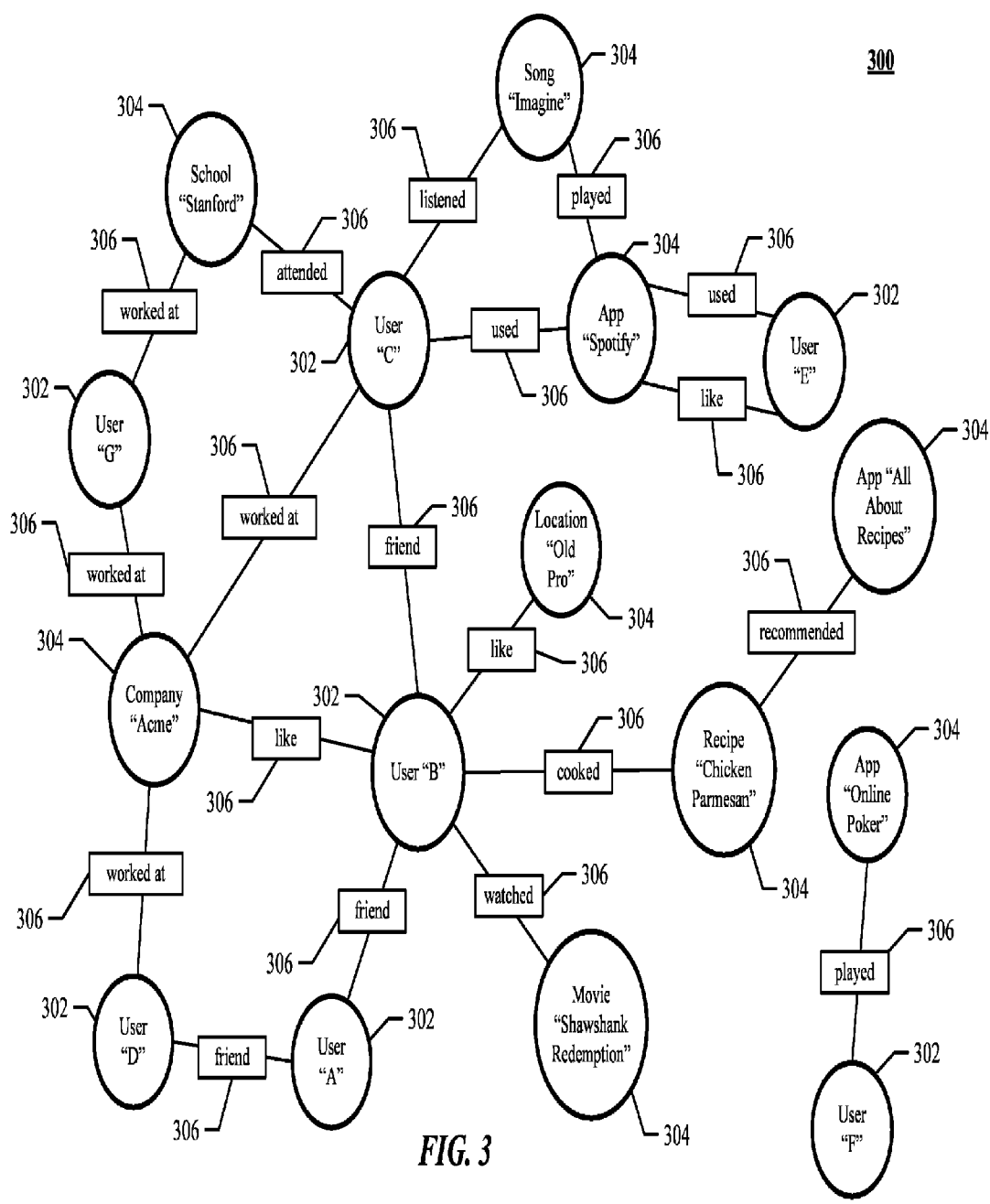
FIG. 3 illustrates an example social graph.

FIG. 3 illustrates example social graph 300. In particular embodiments, social-networking system 160 may store one or more social graphs 300 in one or more data stores. In particular embodiments, social graph 300 may include multiple nodes—which may include multiple user nodes 302 or multiple concept nodes 304—and multiple edges 306 connecting the nodes. Example social graph 300 illustrated in FIG. 3 is shown, for didactic purposes, in a two-dimensional visual map representation. In particular embodiments, a social-networking system 160, client system 130, or third-party system 170 may access social graph 300 and related social-graph information for suitable applications. The nodes and edges of social graph 300 may be stored as data objects, for example, in a data store (such as a social-graph database). Such a data store may include one or more searchable or queryable indexes of nodes or edges of social graph 300.

In particular embodiments, a user node 302 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 302 corresponding to the user, and store the user node 302 in one or more data stores. Users and user nodes 302 described herein may, where appropriate, refer to registered users and user nodes 302 associated with registered users. In addition or as an alternative, users and user nodes 302 described herein may, where appropriate, refer to users that have not registered with social-networking system 160. In particular embodiments, a user node 302 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 302 may be associated with one or more data objects corresponding to information associated with a user. In particular embodiments, a user node 302 may correspond to one or more web pages.

In particular embodiments, a concept node 304 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 304 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 304 may be associated with one or more data objects corresponding to information associated with concept node 304. In particular embodiments, a concept node 304 may correspond to one or more web pages.

In particular embodiments, a node in social graph 300 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. As another example and not by way of limitation, a concept node 304 may have a corresponding concept-profile page in which one or more users may add content, make declarations, or express themselves, particularly in relation to the concept corresponding to concept node 304.

In particular embodiments, a concept node 304 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 302 corresponding to the user and a concept node 304 corresponding to the third-party webpage or resource and store edge 306 in one or more data stores.

In particular embodiments, a pair of nodes in social graph 300 may be connected to each other by one or more edges 306. An edge 306 connecting a pair of nodes may represent a relationship between the pair of nodes. In particular embodiments, an edge 306 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 306 connecting the first user's user node 302 to the second user's user node 302 in social graph 300 and store edge 306 as social-graph information in one or more of data stores (e.g., data stores associated with social-networking system 160). In the example of FIG. 3, social graph 300 includes an edge 306 indicating a friend relation between user nodes 302 of user "A" and user "B" and an edge indicating a friend relation between user nodes 302 of user "C" and user "B." Although this disclosure describes or illustrates particular edges 306 with particular attributes connecting particular user nodes 302, this disclosure contemplates any suitable edges 306 with any suitable attributes connecting user nodes 302. As an example and not by way of limitation, an edge 306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 300 by one or more edges 306.

In particular embodiments, an edge 306 between a user node 302 and a concept node 304 may represent a particular action or activity performed by a user associated with user node 302 toward a concept associated with a concept node 304. As an example and not by way of limitation, as illustrated in FIG. 3, a user may "like," "attended," "played," "listened," "cooked," "worked at," or "watched" a concept, each of which may correspond to a edge type or subtype. A concept-profile page corresponding to a concept node 304 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 306 and a "used" edge (as illustrated in FIG. 3) between user nodes 302 corresponding to the user and concept nodes 304 corresponding to the song and application to indicate that the user listened to the song and used the application. Moreover, social-networking system 160 may create a "played" edge 306 (as illustrated in FIG. 3) between concept nodes 304 corresponding to the song and the application to indicate that the particular song was played by the particular application. In this case, "played" edge 306 corresponds to an action performed by an external application (SPOTIFY) on an external audio file (the song "Imagine"). Although this disclosure describes particular edges 306 with particular attributes connecting user nodes 302 and concept nodes 304, this disclosure contemplates any suitable edges 306 with any suitable attributes connecting user nodes 302 and concept nodes 304. Moreover, although this disclosure describes edges between a user node 302 and a concept node 304 representing a single relationship, this disclosure contemplates edges between a user node 302 and a concept node 304 representing one or more relationships. As an example and not by way of limitation, an edge 306 may represent both that a user likes and has used at a particular concept. Alternatively, another edge 306 may represent each type of relationship (or multiples of a single relationship) between a user node 302 and a concept node 304 (as illustrated in FIG. 3 between user node 302 for user "E" and concept node 304 for "SPOTIFY").

In particular embodiments, social-networking system 160 may create an edge 306 between a user node 302 and a concept node 304 in social graph 300. As an example and not by way of limitation, a user viewing a concept-profile page (such as, for example, by using a web browser or a special-purpose application hosted by the user's client system 130) may indicate that he or she likes the concept represented by the concept node 304 by clicking or selecting a "Like" icon, which may cause the user's client system 130 to transmit to social-networking system 160 a message indicating the user's liking of the concept associated with the concept-profile page. In response to the message, social-networking system 160 may create an edge 306 between user node 302 associated with the user and concept node 304, as illustrated by "like" edge 306 between the user and concept node 304. In particular embodiments, social-networking system 160 may store an edge 306 in one or more data stores. In particular embodiments, an edge 306 may be automatically formed by social-networking system 160 in response to a particular user action. As an example and not by way of limitation, if a first user uploads a picture, watches a movie, or listens to a song, an edge 306 may be formed between user node 302 corresponding to the first user and concept nodes 304 corresponding to those concepts. Although this disclosure describes forming particular edges 306 in particular manners, this disclosure contemplates forming any suitable edges 306 in any suitable manner.

In particular embodiments, a set of objects may be organized into a hierarchy based on, for example, how the individual objects are related to each other. An object hierarchy may have any number of levels, and at each level, there may be any number of objects. Parent-child or sibling relationships may exist between specific objects in the hierarchy. Within an object hierarchy, a parent object is one level above the level of its child objects. Two sibling objects are at the same level and share the same parent object. In addition, any portion of the hierarchy may also be considered a hierarchy in itself.

Figure 4:
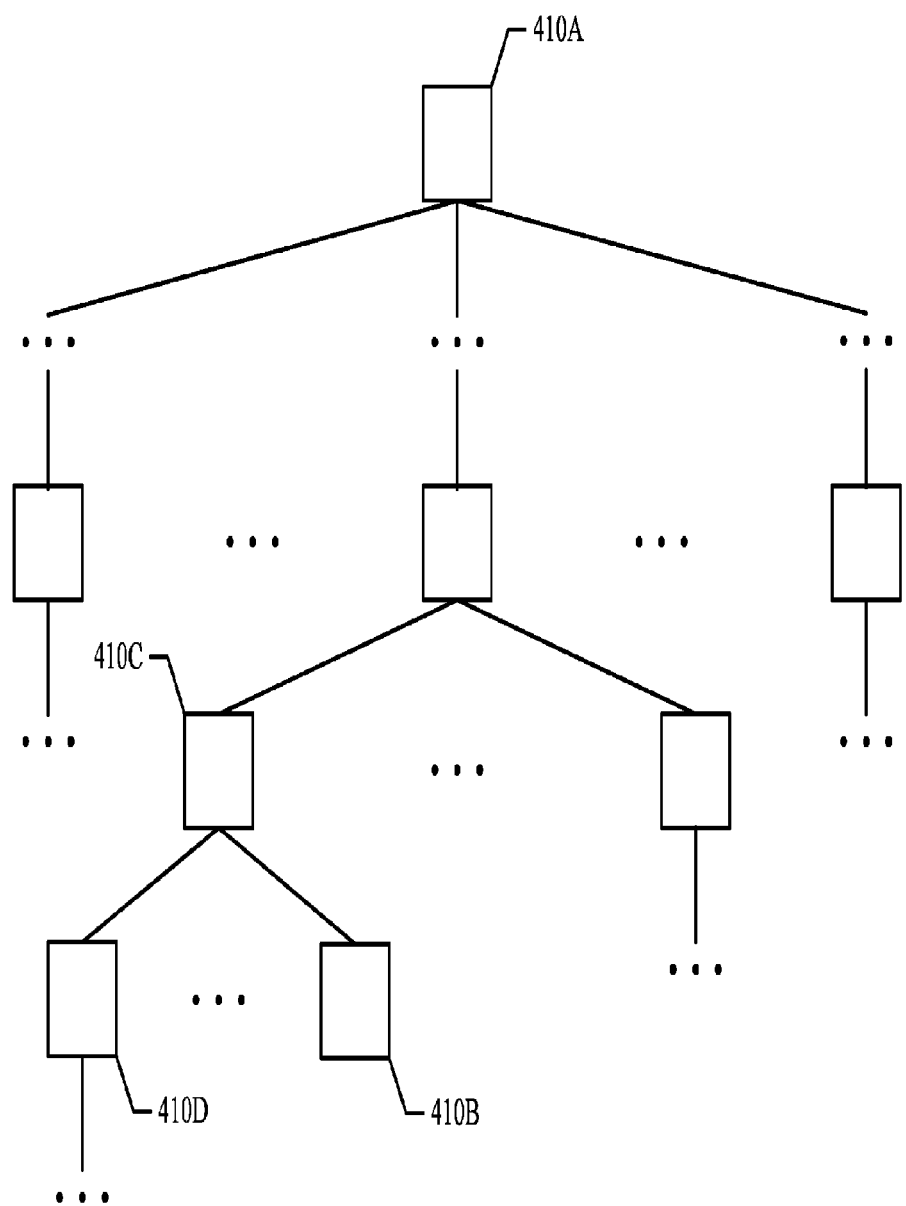
FIG. 4 illustrates an example object hierarchy.

FIG. 4 illustrates a portion of an example object hierarchy 400 that includes a number of objects 410. FIG. 4 is in fact a visual representation of an object hierarchy. Each node represents a specific object in the hierarchy, and each edge connecting two nodes represents a parent-child relationship between the two corresponding objects.

In particular embodiments, an object in a hierarchy may or may not have a parent. If an object does not have a parent, it may be referred to as a "root" object (e.g., object 410A). Typically, the root object is positioned at the first or topmost level of the hierarchy. In particular embodiments, an object in a hierarchy may or may not have any children. If an object does not have any children, it may be referred to as a "leaf" or "terminal" object (e.g., object 410B). If an object does have children (e.g., object 410C), it may have any number of children. In addition, objects sharing the same parent may be referred to as each other's "siblings". For example, in FIG. 4, object 410C is the parent of objects 410D and 410B. Objects 410D and 410B are the children of object 410C and are siblings to each other. Thus, a hierarchy of objects (e.g., object hierarchy 400) not only includes the individual objects (e.g., objects 410) themselves but also indicates the relationships among the specific objects. Moreover, the position of a specific object within the hierarchy may indicate its relationships with other objects in the hierarchy.

Objects 410 may be of various types, and this disclosure contemplates any applicable object types. For example and without limitation, the term "object" may refer to any type of content, including but not limited to images, videos, captions, text blocks or boxes, user-interface elements, clickable links, newsfeed stories, references to other objects, advertisements, calendar events, units for displaying open graph analysis that may be graphically rendered, applications, websites, web pages, books, chapters. In particular embodiments, given a hierarchy of objects, which may be a portion of another, larger hierarchy of objects, the hierarchical relationships (e.g., parent-child or sibling relationships, positions of the objects within the hierarchy) between specific objects may direct some aspects of how these objects behave in the context of a user interface or how the objects are presented to a user.

As an example, in the context of the desktop of a computing device, the desktop may be a parent object, and sometimes the root object of a hierarchy, whose child objects are the individual software applications available on the desktop. A software application, while itself being one of the child objects of the desktop, is also the parent object of the individual components of that software application. Different software applications may include different components. For example, for a software application that manages digital books (e.g., a book reader application), its components may include the digital books available, the individual chapters of each book, the pages of each chapter, and the texts, images, videos, audios, or other content or media elements on each page. Each of these also corresponds to an object (e.g., user-interface component) in the hierarchy. More specifically, within the hierarchy, the digital book application may be the parent object of the digital books. A digital book may be the parent object of the individual chapters of that book. A chapter, while itself being one of the child objects of the book, is also the parent object of the pages in that chapter. A page is the parent object of the texts, images, videos, audios, or other content or media elements on that page. A text block, image, video, audio, or other content or media element is one of the child objects of the page to which it belongs. Similarly, for a software application that manages news feeds, its components may include the individual news channels and the news stories within each channel. Each of these may correspond to an object. Within the hierarchy, the news-feed application, while itself being one of the child objects of the desktop, is also the parent object of the news channels. A news channel in turn is the parent object of the news stories included in that channel.

As another example, in the context of the Internet or the World Wide Web, the Internet may be a parent object whose child objects are the individual websites. A website, while itself being one of the child objects of the Internet, is also the parent object of the individual web pages of that website. A web page, while itself being one of the child objects of the website to which it belongs, is the parent object of the texts, images, videos, audios, or links (e.g., Uniform Resource Locators (URLs)) included in the web page. Each text block, image, video, audio, or link may also correspond to a specific object in the hierarchy.

As a third example, a website, such as a social-networking website implemented by social-networking system 160, may also be arranged in a hierarchical structure for navigating the content of the social-networking website. In this context, the social-networking website may be a parent object whose child objects are the components (e.g., photo albums, user profile pages, etc.) of the website. For example, a photo album, while itself being a child object of the social-networking website, may in turn be a parent object, and the individual photos within the album may be the child objects of the photo album. A user's profile page may be structured in such a hierarchical fashion as well. The profile page itself may be considered a parent object, and the individual objects on the profile page may be the child objects of the profile page. In particular embodiments, a profile page may be considered and rendered (e.g., for presentation to a user) as a linear timeline of objects, such as, for example and without limitation, photos, photo albums, check-ins, comments from other users, attended events, tags, applications the user has added to the profile page, stories, songs the user has listened to, playlists. These various types of objects may all be children of the profile page, or may be further arranged into multiple levels. With some implementations, a user's profile page may include any number of sections, such as the user's education and employment information, the user's public "wall", or the user's social connections. Then the various types of objects above may be divided into specific sections.

In particular embodiments, an object 410 may be a component of a user interface. In this case, object hierarchy 400 may correspond to the user interface, and each object 410 may correspond to a specific component of the user-interface. A user interface may have various types of components, and this disclosure contemplates any applicable user-interface component types. For example, a user-interface component (i.e., an object 410) may be a window, a section, a tab, an image, a video, an audio, a text block, a menu, an icon, a button, a checkbox, a website, a web page, a frame, a clickable link, a message, a post, or an input field. In particular embodiments, an object 410 may be consumed by a user if the user is able to, for example and without limitation, interact with, view, read, listen to, manipulate, or handle the object 410. For example, some user-consumable objects 410 may be texts, images, videos, audios, feeds, executables (e.g., application programs or games), websites, web pages, digital books, photo albums, posts, or messages.

In particular embodiments, when the user interface corresponding to object hierarchy 400 is displayed (e.g., on a client system 130), the structure of the corresponding object hierarchy 400 may reflect the structure of the user interface. The relationships among the individual components in the user interface, as reflected in object hierarchy 400, may influence how these components are organized and presented to users. The user interface may have any number of layers, respectively corresponding to the individual levels of object hierarchy 400. Objects 410 (e.g., user-interface components) at a specific level of object hierarchy 400 are displayed in the corresponding layer of the user interface. With some implementations, the lowest or bottommost layer of the user interface corresponds to the first or topmost level of object hierarchy 400. Thus, root object 410A is displayed in the lowest layer of the user interface. Furthermore, in the user interface, each object 410 (e.g., user-interface component) is displayed in a layer immediately above the layer where its parent, if one exists, is displayed and immediately below the layer where its children, if any, are displayed. Sibling objects 410 are displayed at the same layer. Thus, the position of a component in the user interface indicates its relationships (e.g., parent-child or sibling) with other components in the user interface.

In particular embodiments, the user interface and any components of the user interface may not be associated with an object hierarchy. In yet other embodiments, the user interface and components of the user interface may be associated with an object hierarchy 400, and interactive elements (described further herein) may, for example, be in the same layer as other objects or components of the user interface (e.g., in the same level of object hierarchy 400) or in a different layer than other objects or components of the user interface (e.g., in a different level of object hierarchy 400).

In particular embodiments, a user-interface component (e.g., an image, a video, a folder, etc.) may be displayed in various display modes. As an example, the user-interface component may be displayed in a "full-screen" mode, where the user-interface component occupies the entire or nearly the entire display area (e.g., the screen of an electronic device). As another example, the user-interface component may be displayed in an "on-page" mode, where the user-interface component is included in another user-interface component and displayed as a part of that other user-interface component (e.g., an image is displayed as a part of a web page). As a third example, the user-interface component may be displayed in an "index" mode, where the user-interface component is a part of a series of user-interface components (e.g., an image is displayed together with other images from the same album, or a chapter of a book is displayed in the table of content of the book together with other chapters from the same book).

In particular embodiments, a hierarchical user interface may be used to present content to a user. Such a user interface may be referred to as a "content feed" or "news feed" user interface. The content may be of any type and format, such as, for example and without limitation, text, icon, image, video, audio, web page, post, or message. This disclosure contemplates any applicable content type and format. In particular embodiments, the individual content items (e.g., text, image, video, audio, web page, post, message, news piece, etc.) may be organized into various categories, referred to as content sections. For example, related content items may be categorized into the same content section. The user interface may include any number of content sections, and each content section may include any number of content items. Hierarchically, a content section may be the parent of the content items belonging to that section. For example, various photos taken during a holiday trip may be organized into the same album, and various photo albums may be organized into the photo section of the user interface.

In particular embodiments, a user may consume or interact with a specific content item. For example, a user may consume or interact with a content item when the user scrolls, opens up, views, listens to, selects, reviews, comments on, clicks on, or taps the content item. This disclosure contemplates any applicable means for a user to consume or interact with a content item.

As described above, a user may interact with a computing device (e.g., a mobile device, a television, a personal computer, a smartphone, tablet computer, etc.) through an application running on the computing device. The application may be, for example, a news feed application associated with a social-networking website, a game, a web browser, a telephony or text-messaging application, or any other suitable type of application. In particular embodiments, while the user interacts with the application on the computing device, the user may be presented with an interactive element (e.g. on a screen of the computing device such as touch screen 215 or 225) that indicates any suitable information to the user. As an example, the interactive element may indicate that the user has received a message (e.g. from a second user on a social-networking website in which both participate, from an entity on the social-networking website, from a group on the social-networking website, from a concept node of the social-networking website, or from any other suitable source). The interactive element may, in particular embodiments, include some or all of the text of the message and may, in other embodiments, be displayed without text of the message. As another example, the interactive element may indicate that the user has received a message including, e.g., a telephone call, an email, a Short Message Service (SMS) message, an instant message, or any other type of message from any suitable source (whether on or off a social-networking website). Any suitable type of information may be indicated by an interactive element including, for example, breaking news, trending topics, or actions associated with other users, entities, groups, or nodes of the social-networking website. For example, an interactive element may include text indicating an action associated with a second user of the social-networking website, such as the second user tagging the user in a post or the second user liking a post of the user in the social-networking website. An interactive element may, in particular embodiments, not be associated with a particular item of information or event—for example, an interactive element may correspond only to the opening of a user interface (to be described further below). In particular embodiments, an interactive element may indicate more than one type of information. As an example, the interactive element may indicate that the user has received a message from a second user of a social-networking website, and it may also indicate that the second user is performing one or more actions (e.g., associated with the social-networking website). For example, the interactive element corresponding to the second user may visually indicate that the second user is currently listening to music (e.g., with a music note), typing another message to the user of the computing device, or reading or sharing an article (e.g., with a symbol of a book). Any suitable status or action of a user, entity, group, or node may be visually indicated by the interactive element corresponding to the user, entity, group, or node. The computing device may, in particular embodiments, receive an indication of information before it displays the interactive element indicating the information to the user. As an example, the computing device may receive an indication (e.g. via a communication from a server of social-networking system 160) that the user has received a message from a second user on the social-networking website. The computing device may then display an interactive element to the user to indicate this information to the user. In particular embodiments, the interactive element may gradually appear (e.g., fade in) on the screen of the computing device. The interactive element may be displayed to the user within a pre-determined amount of time after the computing device receives the indication of information (e.g., within ten minutes, five minutes, one minute, thirty seconds, ten seconds, or real-time), and this pre-determined amount of time may, for example, depend on the type of information to be indicated (e.g., the type of message received), or the status of the computing device (e.g., online or in sleep mode). In particular embodiments, the interactive element may be automatically positioned or arranged in a particular area of the display of the user interface (e.g., in the top right of the display). The particular area of the display of the user interface may be a default area in the display or it may be associated with a position where the user has previously placed one or more interactive elements (or a stack of interactive elements, described herein).

In particular embodiments, an interactive element may function independently of an application running on the computing device. As an example, if the user is playing a game on the computing device, and an interactive element is displayed to the user (e.g., indicating that the user has a message from a second user on a social-networking website), the interactive element may be displayed independently from the game application (e.g., the interactive element may "float" on top of the display of the game). In particular embodiments, the interactive element may be displayed in a persistent manner, for example, so that the interactive element may continue to be displayed even if the underlying application (e.g. a game) is paused, stopped, or exited. In particular embodiments, the interactive element may function in a manner that does not alter the activity of the application running on the computing device. For example, the game may continue to operate without interruption during the display of the interactive element. As another example, the game may continue to operate without interruption if the interactive element is dismissed by the user. As yet another example, to be described further below, the game may pause but not be exited or otherwise lose its state information if the user interacts with the interactive element.

As described above, an interactive element may be displayed in a persistent manner. In particular embodiments, an interactive element may be displayed until the computing device either receives user input selecting the interactive element or user input dismissing the interactive element. By way of example, user input selecting the interactive element may include clicking on the interactive element (using, e.g., an input/output device such as a mouse or a track pad), tapping the interactive element (using, e.g., a stylus or the user's finger), dragging the interactive element, or any other suitable touch or gesture (e.g. single tap, double tap, short press, long press, slide, swipe, flip, pinch open, or pinch close). Different user inputs may result in selection of the interactive element, and this disclosure contemplates any applicable user input for selection. Additionally, different types of user inputs may be mapped by the computing device to different types of behaviors. For example, the user may select the interactive element by pressing the element on a screen of the computing device. The user may reposition the interactive element for continued display on the screen by selecting the interactive element (e.g. by pressing it) and dragging it to a desired location on the screen. The user may also select the interactive element by tapping the interactive element, opening a user interface to be described further below. The user may also open the user interface by selecting and dragging an interactive element to a particular area of the screen (e.g., the rightmost edge). As yet another example, the user may drag and drop a content item from an application running on the computing device (e.g., in the case of a news feed application, a photo, album, link, or any other open graph edge or node, as suitable) to an interactive element, opening the user interface. In particular embodiments in which a user interface is opened, when the user interface is closed or otherwise dismissed by the user, the interactive element selected to open the user interface may once again be persistently displayed to the user. The interactive element may include a visual indicator that the user interface was opened. User input dismissing the interactive element may include any suitable touch or gesture, such as those described above. The user may, for example, provide input to dismiss the interactive element by pressing the interactive element and dragging it "off" (e.g. toward the edge of) the screen of the computing device. If the computing device receives user input to dismiss the interactive element, the interactive element may be removed from display to the user (e.g., removed from the screen display of the computing device). The interactive element, when dismissed, may gradually disappear (e.g., fade out) from the screen of the mobile device. In particular embodiments in which a user interface is opened, when the user interface is closed or otherwise dismissed by the user, the interactive element selected to open the user interface may no longer be displayed to the user.

In particular embodiments, when the computing device receives user input selecting an interactive element (e.g., by any of the gestures or actions described above), a user interface is opened by the computing device. The user interface may, for example, be a contextual menu offering the user various options including sending a message or chat, sharing a content item (e.g., photo, album, link, or any other open graph edge), or viewing a particular user's profile. The user interface may include a display of the interactive element that was selected to open the user interface. As another example, the user interface may be a messaging or chat application that enables the user to interact with (e.g., read or reply to) one or more messages received from a second user (who is indicated by an interactive element), create a message or chat to another user (who may not be indicated by any interactive element), or share a content item with another user (who may or may not be indicated by any interactive element). The user interface opened by the computing device may function independently of an application running on the computing device. As an example, if the user is browsing with a web browser application, an interactive element is displayed to the user, and the user selects the interactive element, the user interface (e.g., a messaging application) may be opened and may function independent of the web browser application, without causing the web browser application to exit or otherwise alter its activity. For example, the browser application (e.g. playing a video) may continue to operate without interruption during the display of the user interface. As another example, the browser application may continue to operate without interruption if the user interface is closed or otherwise dismissed by the user. In particular embodiments, the application may pause (or otherwise save its state) upon opening of the user interface, and the application may resume (e.g. return to the state it was in immediately before the user interface was opened) upon the closing or dismissal of the user interface. A user interface may also be displayed independent from the browser application (e.g., the messaging application may "float" on top of the display of the browser application). In particular embodiments, the user interface may be displayed even if the underlying application (e.g. a browser application playing a video) is paused, stopped, or exited. The user interface may be closed or dismissed by the user via any of the gestures described above. For example, the user interface may be closed or dismissed by a tap on an interactive element displayed by the user interface.

In particular embodiments, a user may be presented with multiple interactive elements that may indicate information to the user. As an example, two different interactive elements may indicate that the user has received two different messages, one from a first user and one from a second user on a social-networking website. As another example, a first interactive element may indicate that the user has received a telephone call (or any other type of message) from a first user and a second interactive element may indicate that user has received an email (or any other type of message) from a second user (whether on or off a social-networking website). Any suitable type of information may be indicated by one or more interactive elements displayed to the user. In particular embodiments, the display and function of each of multiple interactive elements are independent. For example, a first interactive element may be selected, dismissed, or otherwise interacted with independent of a second interactive element. In yet other embodiments, the movement or dismissal of one or more interactive elements causes the automatic repositioning of the remaining interactive elements. In particular embodiments, multiple interactive elements may be configured to be displayed to the user in a stack or a pile on a screen of the computing device. As an example, if a user receives multiple messages (e.g., within a pre-determined period of time), the associated interactive elements may be displayed to the user in a stack. In particular embodiments, if the interactive elements are displayed in a stack or a pile, and if the user selects the stack (e.g., by tapping the topmost element of the stack), a user interface may be opened, as described above. In the user interface, the interactive elements from the stack may be displayed in a series (e.g., a horizontal or vertical series). For example, if the user interface is a messaging application and the interactive elements are associated with messages the user has received, the various interactive elements may be displayed in a series within the messaging application, and the user may be able to select which message to interact with by selecting one of the interactive elements in the series. Additionally, in the example of a messaging application, if the user chooses to reply to a message (e.g., by performing a particular gesture in a particular area of the messaging application display), a keyboard may appear, and this keyboard may persist as the user switches between interactive elements within the messaging application (until, for example, the user performs a gesture to dismiss the keyboard). As another example, if the interactive elements are displayed in a stack or a pile, the user may dismiss the stack or pile of interactive elements by pressing and holding the stack or pile and dragging it "off" (e.g. toward the edge of) the screen of the computing device. This disclosure contemplates any suitable arrangement of interactive elements in a display to a user of a computing device including, for example, a stack or pile, a vertical series, a horizontal series, or a fan-out display. As an example, the interactive elements may be displayed in a digest form (e.g., including recent messages or notifications of actions of other users) on a home screen of a computing device. In the example of a stack or pile display, the display may include a visual indicator that the stack contains more than one interactive element. Additionally, the choice of interactive element for the "top" of the stack may depend on other information—for example, the top element may correspond to the most recent message sent to the user, or a message that has not yet been read by the user. In particular embodiments, the arrangement of interactive elements in a display to the user of a computing device may occur automatically. The arrangement may, for example, depend on the size of the display screen of the computing device. For example, if the computing device is a phone, the screen may be smaller, and the multiple interactive elements may be automatically displayed in a stack or pile (e.g., to conserve screen real estate). For example, if the computing device is a tablet computer, the screen may be larger, and the multiple interactive elements may be automatically displayed in a vertical or horizontal series, allowing for additional information (e.g., current status of a second user associated with an interactive element) to be displayed. In either example, or any time the arrangement of interactive elements occurs automatically, the user may be able to override the default display of interactive elements by, for example, selecting, dragging, and dropping interactive elements from a pile/series or a particular location (or any other automatic or default arrangement) to desired locations on the screen of the computing device. In particular embodiments, the user may specify where interactive elements appear on a screen of the computing device. In particular embodiments, the graphical user interface may include a tension boundary, such that the user may move one or more interactive elements (or any user-interface component) to the tension boundary, at which point the speed of the user's movement of the interactive elements may be reduced (e.g., by half) and/or the interactive elements may "snap back" to a location within the tension boundary.

In particular embodiments, the user may control the specific types of information or events for which interactive elements are displayed to the user. For example, the user may specify in the user's account settings with the social-networking system the types of information or events for which the user wishes to receive interactive elements (e.g., actions taken by friends, actions taken by friends of friends, actions concerning friends, breaking news, etc.). Thereafter, whenever or as soon as an event or information item of the type selected by the user occurs, the social-networking system (e.g., through one of its servers) may send a notification of the event to the user's computing device, which then displays an interactive element to the user.

In particular embodiments, while the user interacts with a computing device on which no application is currently open or active, the user may be presented with one or more interactive elements (e.g. on a screen of the computing device such as touch screen 215 or 225) that indicates information to the user, as described in detail above. The interactive element or elements may be displayed in a persistent manner, and, in particular embodiments, when the computing device receives user input selecting an interactive element (e.g., by any of the gestures or actions described above), a user interface is opened by the computing device, as described in detail above.

Figure 5A:
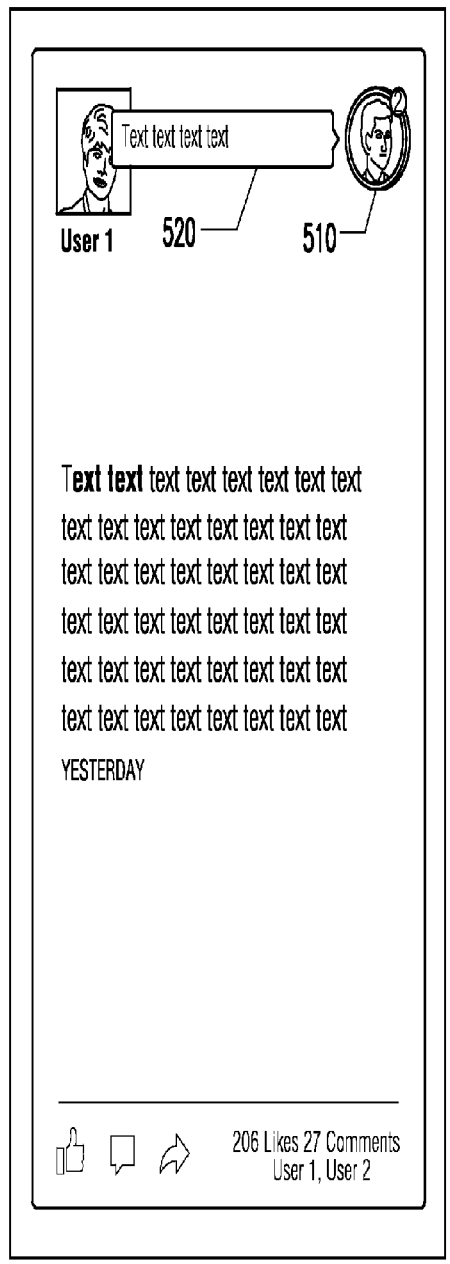
FIGS. 5A-5B illustrate example interactive elements and a user interface.
Figure 5B:
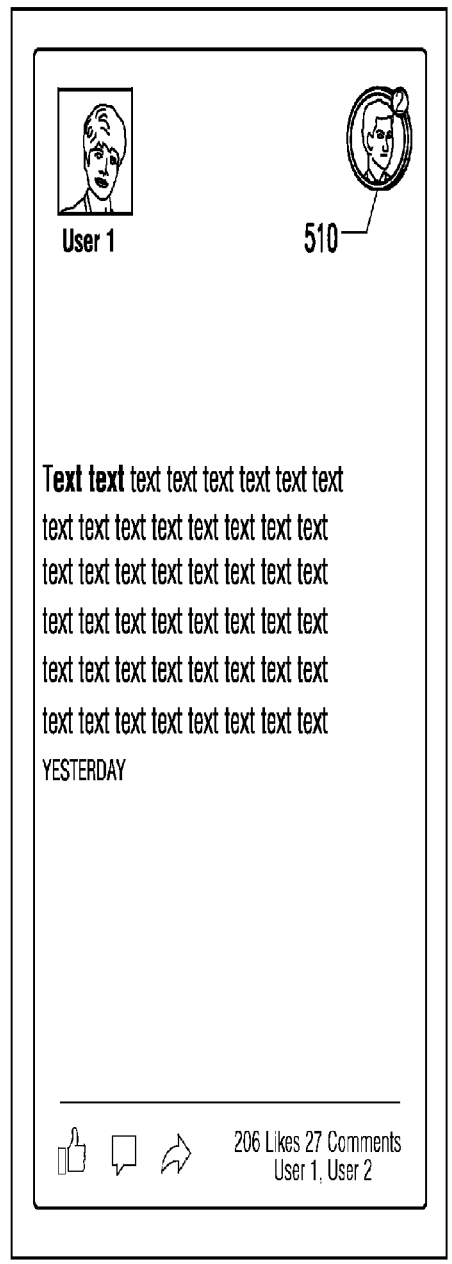

FIGS. 5A-5B illustrate an example stack of interactive elements 510. Here, the stack of interactive elements 510 is displayed on the screen of a smartphone while the user of the smartphone is running and interacting with a social-networking application (a news feed application). In the example of interactive element stack 510, the display of the stack includes a visual indicator that the stack contains more than one interactive element. Additionally, the interactive element on the "top" of the stack appears as an icon including a picture associated with a user of a social-networking system who has recently sent the smartphone user a message 520. In the example of FIG. 5A, the message 520 sent to the user of the smartphone—"How was Tahoe last weekend?"—is displayed (e.g., for a pre-determined amount of time) once it is received. As illustrated by FIG. 5B, after some time (e.g., after the pre-determined amount of time), message 520 disappears from view, leaving only the stack of interactive elements 510. In this example, the stack of interactive elements 510 also includes a visual indicator (the number "2" in a red circle) that indicates that there are unread messages (in this case, two unread messages) from users associated with interactive elements in stack 510. In FIG. 5B, the user of the smartphone continues to interact with the news feed application, and interactive element stack 510 persists on the screen.

In particular embodiments, a user interface may include one or more components. A user-interface component may include, for example, a window, a section, a tab, an image, a video, an audio clip, a text block, a menu, an icon, a button, a checkbox, a website, a web page, a frame, a clickable link, a message, a post, an input field, a sub-component, or an interactive element. In particular embodiments, a user may be presented with one or more interactive elements in a user interface, and the user interface may be automatically modified to accommodate the presentation of these interactive elements. As an example, one or more components of the user interface may be modified to accommodate presentation of one or more interactive elements. Additionally, in particular embodiments, the interactive element or elements may be displayed so as to obscure one or more components of a user interface only in certain cases (e.g., when the component is an image of a certain size), or so as not to obscure one or more components of the user interface in certain cases (e.g., when the components are jewel icons or buttons/affordances of the user interface). In particular embodiments, if the current location or target state of an interactive element would obscure or conceal more than a certain (e.g., pre-determined) amount or percentage of a component of the user interface (e.g., an icon, a button, an affordance, text, or an image), then the location of the interactive element itself may be modified. As an example, the interactive element or elements may be moved to a location that is near (e.g., within a certain radius) to the current or target location, but where the interactive element or elements do not obscure or conceal components of the user interface in excess of the certain amount or percentage. In particular embodiments, this automatic adjustment may occur in conjunction with (e.g., synchronized with) an animation (e.g., during the transition of a component from one mode to another in the user interface).

Figures 6A, 6B:
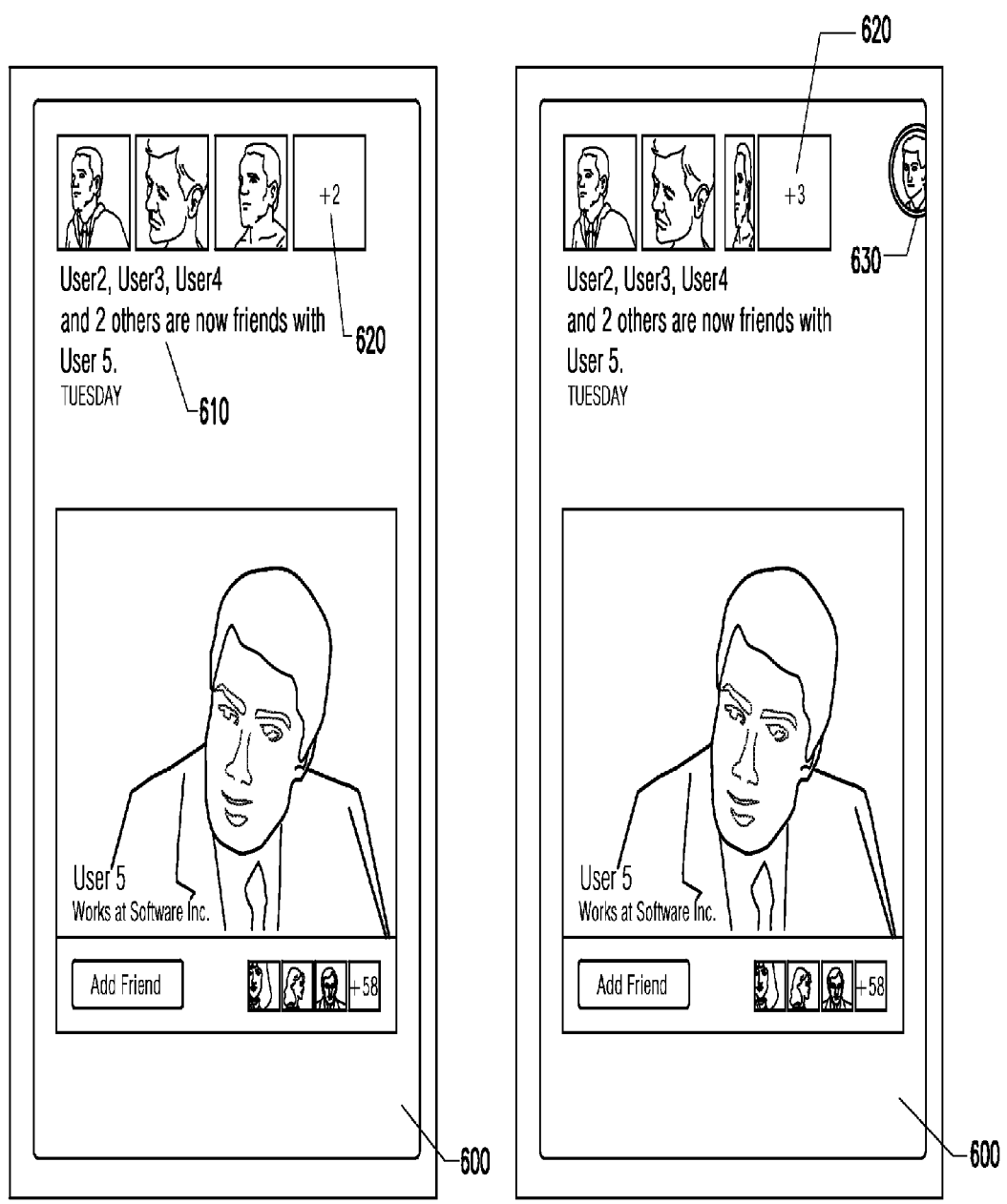
FIGS. 6A-6C illustrate example interactive elements and a user interface.
Figure 6C:
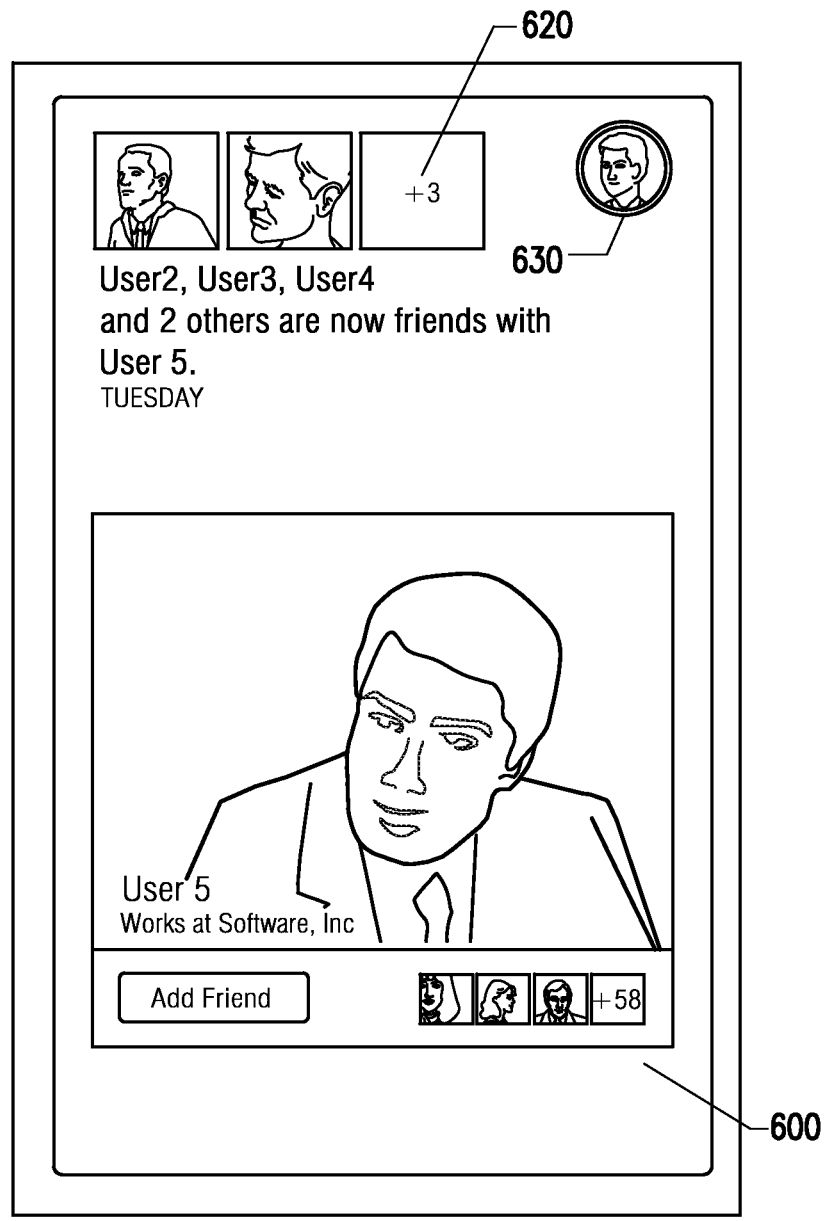

FIGS. 6A-6C illustrate an example user interface. In the examples of FIGS. 6A-6C, a news feed story component 600 is displayed in full-screen mode in the user interface. Component 600 further includes sub-component 610 (text associated with the news feed story) and sub-component 620 (images associated with users of social-networking system 160 associated with the news feed story). In FIG. 6B, an interactive element 630 enters the display of the user interface. Interactive element 630 may, for example, be associated with a message to the user (e.g., the user of the device displaying the user interface) from a second user, entity, group, node, or any other suitable source (e.g., associated with social-networking system 160). In this example, sub-component 620 is automatically modified (e.g., truncated) to accommodate presentation of interactive element 630. In FIG. 6B, one image in sub-component 620 (e.g., an image associated with a user of social-networking system 160 associated with the news feed story) is "squeezed out," and a numeric indicator in sub-component 620 (e.g., the "+2" indicator in FIG. 6A) changes (e.g., to a "+3" indicator). In FIG. 6C, the modification of the user interface in response to the interactive element 630 is complete. Sub-component 610 remains the same in this example, but sub-component 620 has been modified for the display of interactive element 630.

Figure 7A:
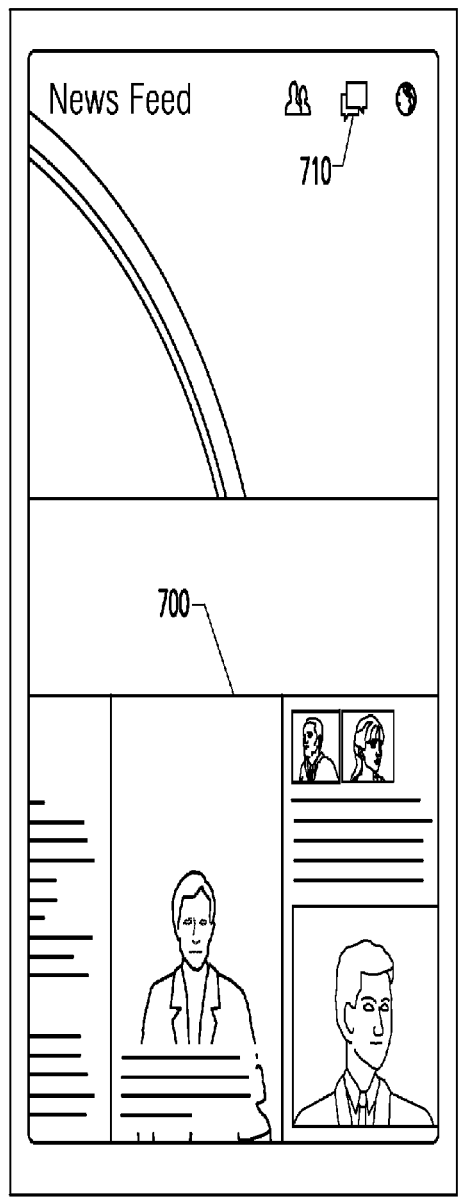
FIGS. 7A-7C illustrate example interactive elements and a user interface.
Figure 7B:
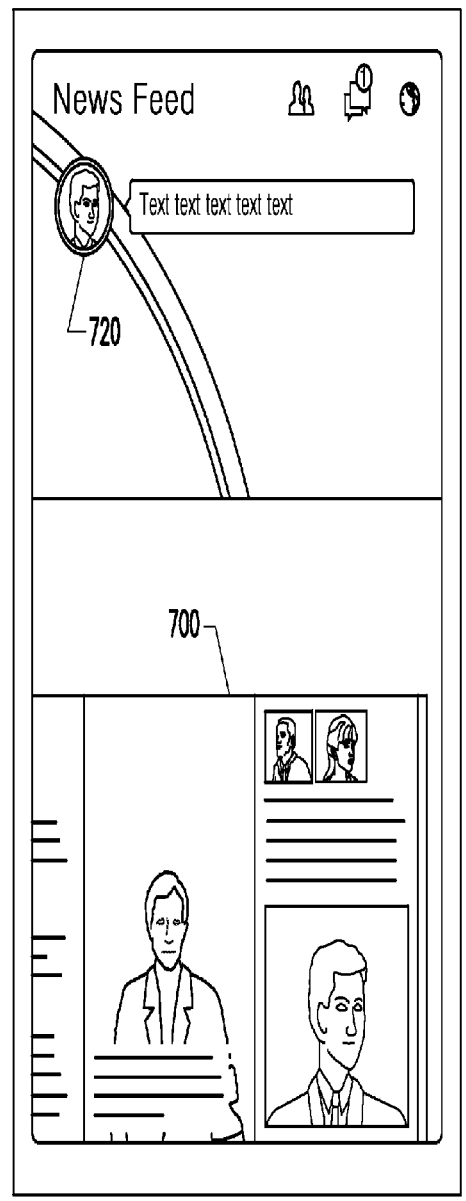
Figure 7C:
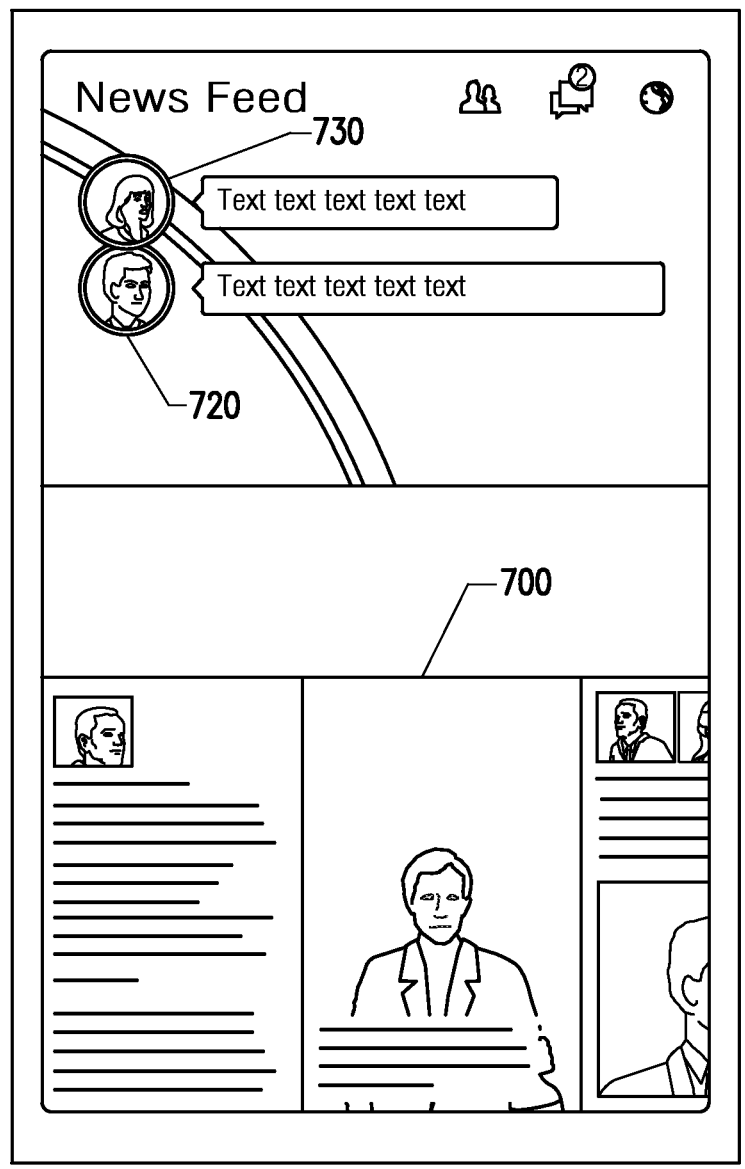

FIGS. 7A-7C illustrate an example user interface. In the examples of FIGS. 7A-7C, a news feed 700 is displayed to the user in index mode. Additionally, multiple icons 710 are displayed in the upper right area of the user interface, each icon providing different information (e.g., notifications) or buttons/affordances to a user. In FIG. 7B, an interactive element 720 is presented to the user in the user interface. The interactive element 720 includes a message (e.g., from a user associated with the interactive element to the user of the device displaying the user interface). In this example, the interactive element 720 is automatically displayed in a location in the user interface so as not to obscure either the news feed component 700 or any of the jewel icon components 710. In FIG. 7C, a second interactive element 730 is presented to the user in the user interface. The second interactive element 730 also includes a message (e.g., from a second user to the user of the device displaying the user interface). In this example, interactive element 720 is automatically shifted and displayed in a new location in the user interface, still not obscuring either the news feed component 700 or any of the jewel icon components 710. Furthermore, interactive element 730 is also automatically displayed in a location in the user interface so as not to obscure either the news feed component 700 or any of the jewel icon components 710, but interactive element 730 does, in this example, obscure a portion of interactive element 720.

In particular embodiments, a user may consume or interact with a component of a user interface. For example, a user may interact with a component of a user interface when the user selects, clicks, taps, pinches, zooms in, zooms out, resizes, reviews, comments, or performs any other gesture on the component or any of its sub-components (e.g., constituent components). In particular embodiments, when a user interacts with a component of the user interface, one or more components of the user interface (e.g., the component with which the user interacts, sub-components of this component, or other components of the user interface) may be affected by (e.g., modified in response to) the user interaction. Components of the user interface may be affected by the user interaction non-uniformly or independently of one another. As an example, if a user resizes a component to be smaller by a scaling factor X, one or more sub-components of the component (or other components of the user interface) may also be resized to be smaller by scaling factor X, and other sub-components of the component (or other components of the user interface) may be resized to be smaller by scaling factor 1.5×. Sub-components of the component or other components of the user interface may be affected by the user interaction in a manner different from the user interaction. In the example in which the user resizes a component to be smaller, some sub-components of the component (or other components of the user interface) may not be resized at all, other sub-components of the component (or other components of the user interface) may no longer be visible within the user interface after the component is resized, and still other sub-components of the component (or other components of the user interface) may be shifted, rearranged, reordered, or otherwise modified. Further examples of modification of a component include changing color, modifying based on prominence of a component (e.g., determined from information gathered from social graph 300), or modifying based on the type of a component (e.g., scaling image components but removing all text components, or preserving "like" or tag components but removing comment components). This disclosure contemplates any suitable means for a user to consume or interact with a component of a user interface, including any of its sub-components or other components of the user interface.

Figure 8A:
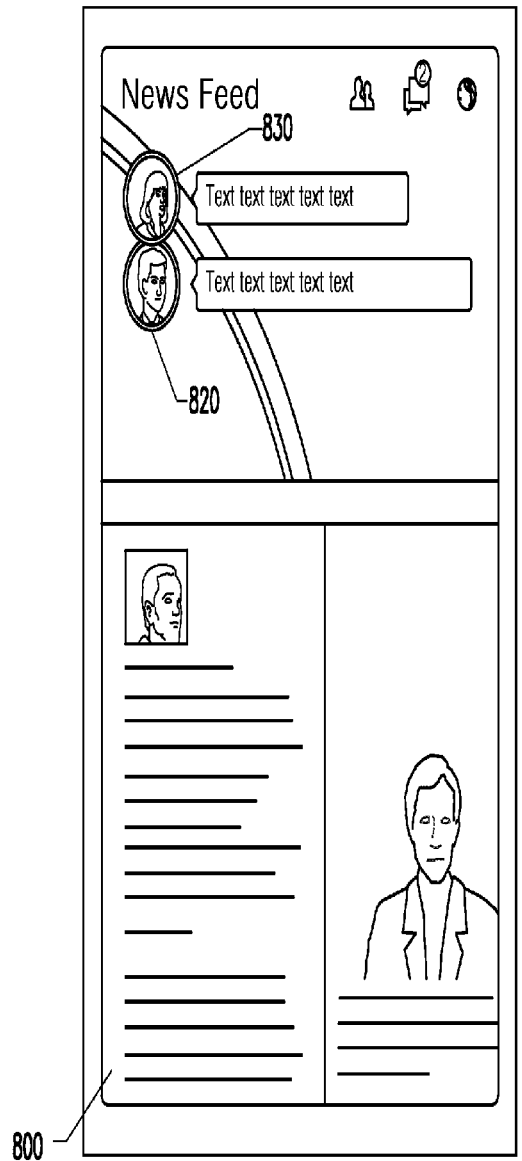
FIGS. 8A-8C illustrate example interactive elements and a user interface.
Figure 8B:
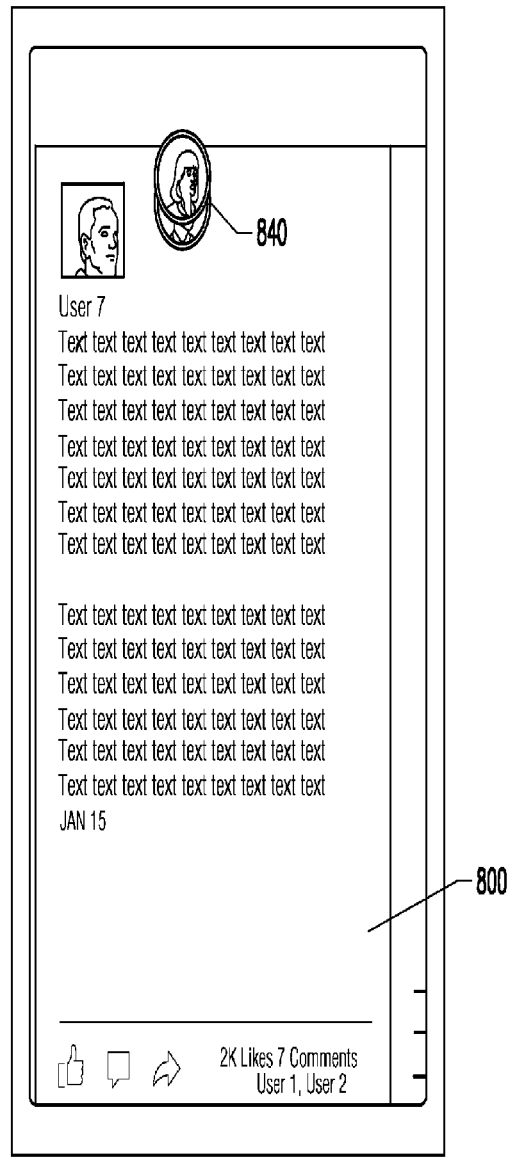
Figure 8C:
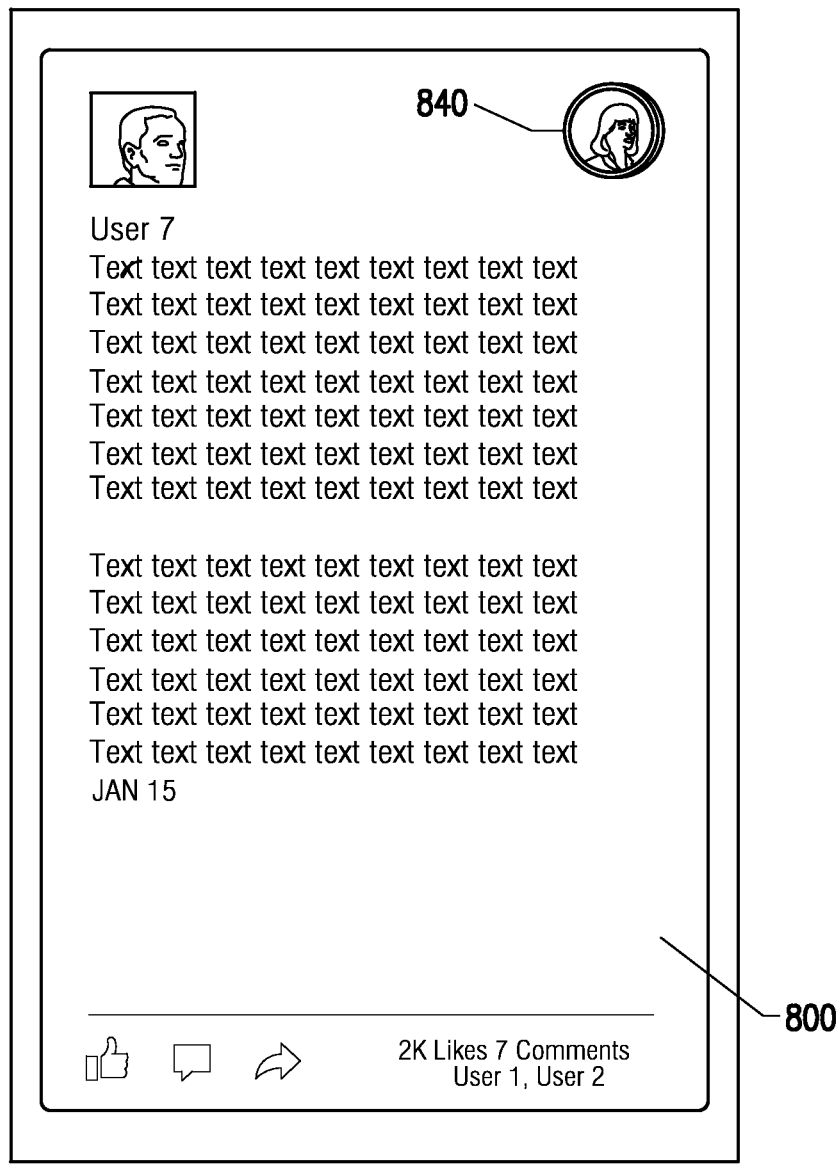

FIGS. 8A-8C illustrate an example of a user interaction with component 800 (a news feed story) of the user interface. In the example of FIGS. 8A-8C, the user is resizing component 800 (displayed in index mode in FIG. 8A and in full-screen mode in FIG. 8C) to be larger. Other components of the user interface, including interactive elements 820 and 830, are affected by the user's resizing component 800. In this example, as component 800 is resized to fill the display of the user interface, interactive elements 820 and 830 are modified by: a) having their associated text (e.g., text from messages to the user of the computing device displaying the user interface) removed, b) being arranged in a stack 840, and c) being positioned in stack 840 in the upper right corner of the display. In other examples (not illustrated), the text associated with interactive elements 830 and 820 may not be removed, the interactive elements 830 and 820 may not be stacked, or the location of the interactive elements (whether stacked or not) may be anywhere suitable within the display of the user interface. For example, if the text associated with interactive element 830 and 820 is preserved, the interactive elements may not be stacked and may be repositioned to be located along the left side of the display of the user interface (e.g., depending on the components displayed in the user interface). In particular embodiments, there may be a default position for interactive elements 820 and 830 as one or more components of the user interface transition from one mode (e.g., index mode) to another (e.g., full-screen mode). As an example, when component 800 is in index mode, the default position of interactive elements 820 and 830 may be aligned along the left side of the display of the user interface, but when component 800 is in full-screen mode, the default position of interactive elements 820 and 830 may be in the upper right corner (or, e.g., at a prior position where the user has previously placed interactive elements when in full-screen mode).

Figure 9A:
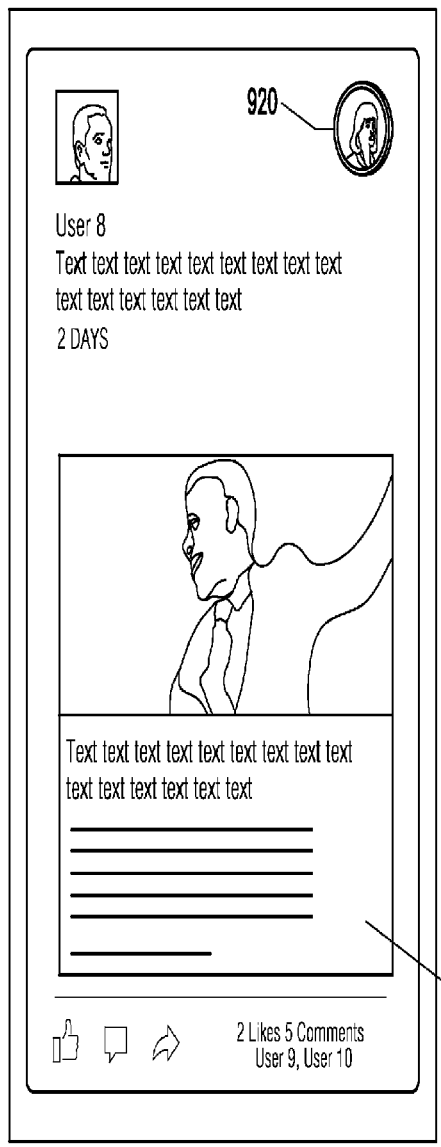
FIGS. 9A-9C illustrate an example interactive element and user interface.
Figure 9B:
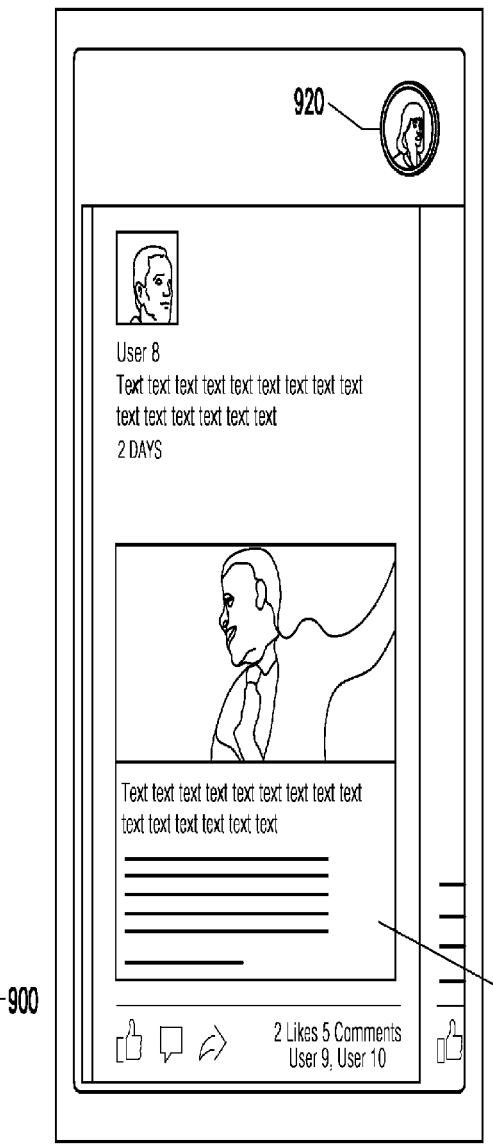
Figure 9C:
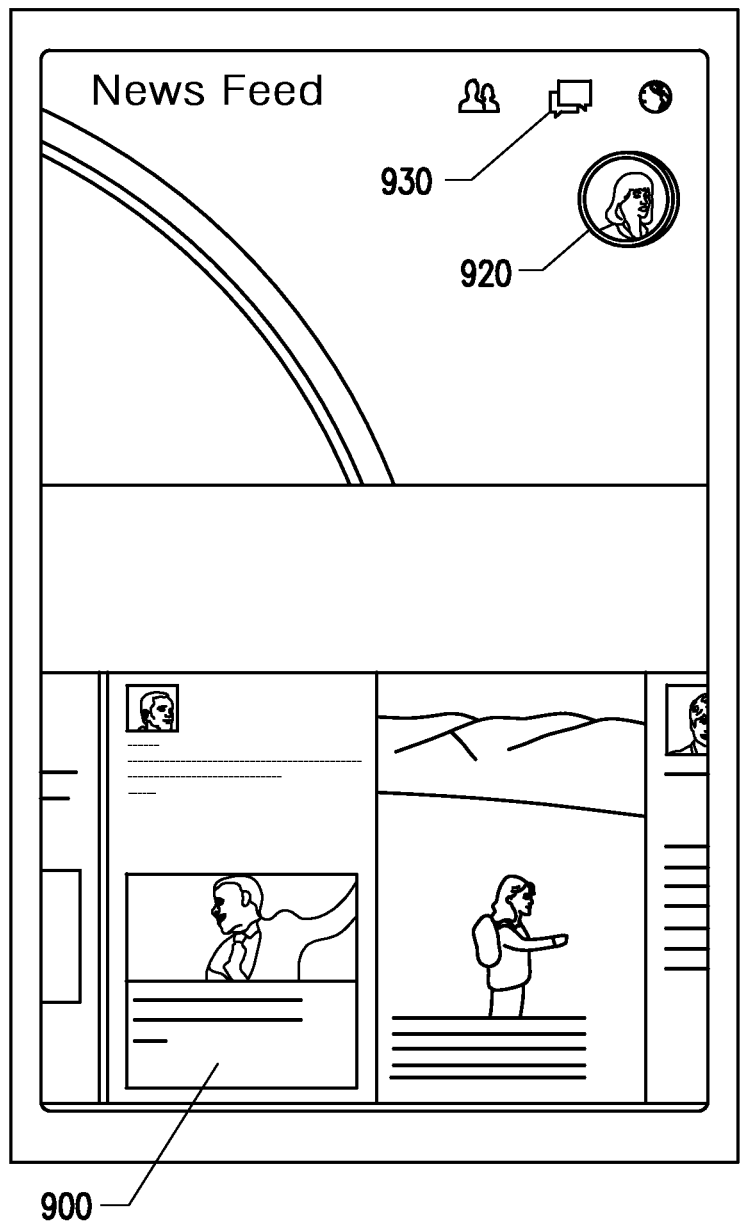

FIGS. 9A-9C illustrate an example of a user interaction with component 900 (a news feed story) of the user interface. In the example of FIGS. 9A-9C, the user is resizing component 900 (displayed in full screen mode in FIG. 9A and in index mode in FIG. 9C) to be smaller. Other components of the user interface, including interactive element stack 920, are affected by the user's resizing component 900. In this example, as component 900 is resized to take up only a portion of the display of the user interface, interactive element stack 920 is modified by being positioned at a lower position in the upper right area of the display. Interactive element stack 920 is automatically repositioned in this location so as to avoid obscuring the affordances/buttons or icons 930 that appear in the user interface when component 900 is in index mode.

Figure 10:
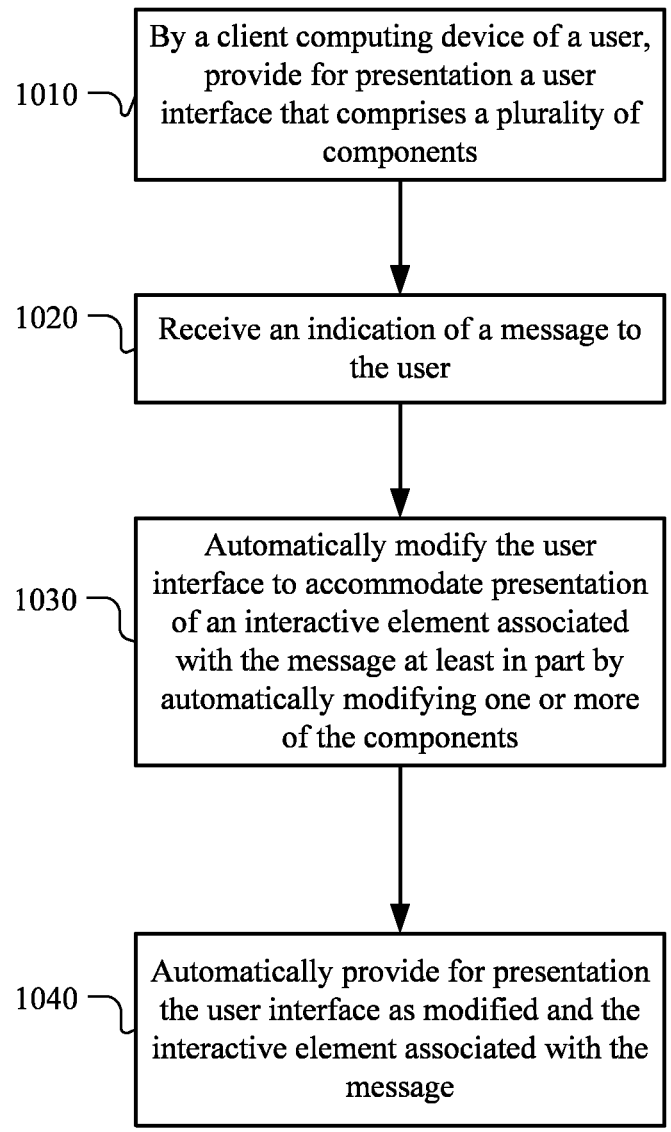
FIG. 10 illustrates an example method for positioning components in a user interface.

FIG. 10 illustrates an example method for positioning components in a user interface. The method may begin at step 1010, where a client computing device of a user provides for presentation a user interface that comprises a plurality of components (e.g. interactive elements, news feed stories, images, text, sub-components). At step 1020, the client computing device may receive an indication of a message (e.g. SMS message, e-mail, phone call, activity or status of another user) to the user. At step 1030, the client computing device automatically modifies the user interface to accommodate presentation of an interactive element associated with the message by automatically modifying one or more of the components (e.g. resizing, adding, removing, rearranging, or repositioning the components). At step 1040, the client computing device automatically provides for presentation the modified user interface with the interactive element associated with the message. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for positioning components in a user interface including the particular steps of the method of FIG. 10, this disclosure contemplates any suitable method for positioning components in a user interface including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
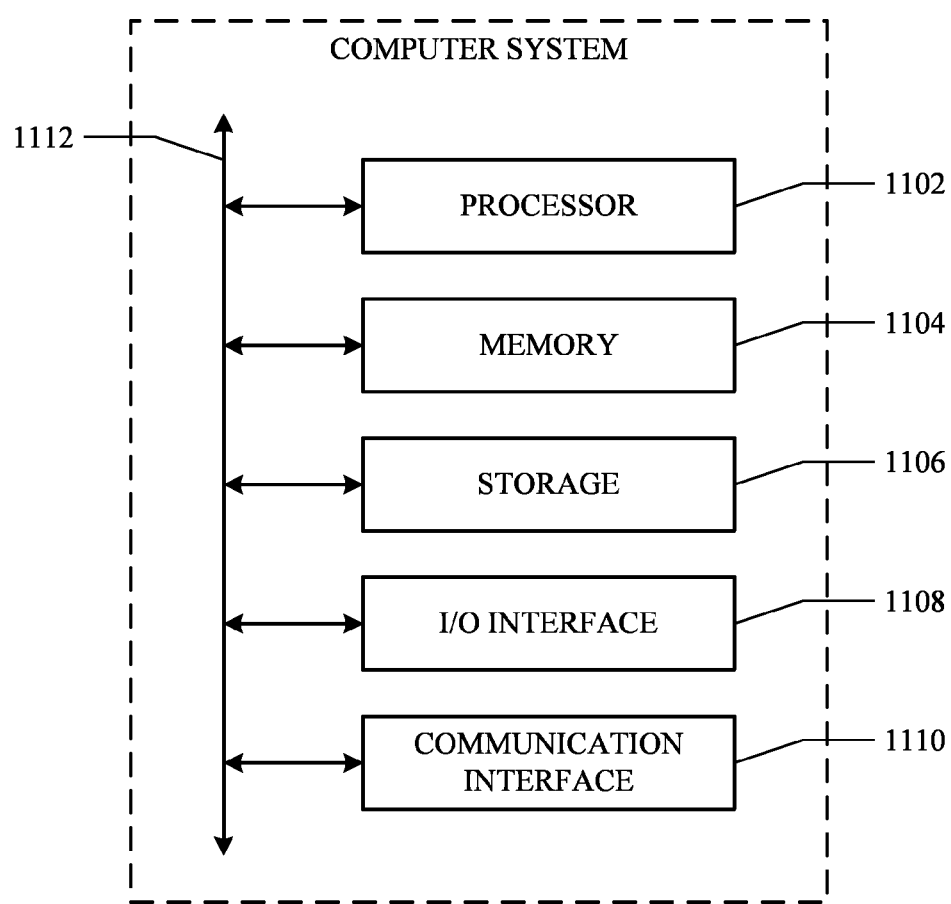
FIG. 11 illustrates an example computer system.

The user interface functionalities described herein may be implemented as computer software and executed on a computer system. FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a client computing device of a user, providing for presentation a user interface (UI) that comprises a plurality of components;
   by the client computing device, receiving an indication of a message to the user;
   by the client computing device, automatically modifying the user interface to accommodate presentation of an interactive element associated with the message at least in part by automatically modifying one of the components based on a current or target location of the component within the UI with respect to a default position of the interactive element in the UI; and
   by the client computing device, automatically providing for presentation the user interface as modified and the interactive element associated with the message.

2. The method of claim 1, wherein the components comprise one or more of the following: a news feed story; an image; text; an interactive element; or a sub-component.

3. The method of claim 1, wherein modifying the component comprises: resizing the component; removing the component from presentation; providing the component for presentation; repositioning the component; or rearranging the component.

4. The method of claim 1, wherein modifying the component comprises modifying a sub-component of the component.

5. The method of claim 4, wherein modifying the sub-component of the component comprises:
   resizing the sub-component;
   removing the sub-component from presentation;
   providing the sub-component for presentation;
   repositioning the sub-component; or
   rearranging the sub-component.

6. The method of claim 1, wherein the automatic modification of one or more of the components is non-uniform.

7. The method of claim 1, wherein modifying the component is based on the type of information indicated by the modified component.

8. One or more computer-readable non-transitory storage media embodying software that is operable when executed to:
   provide for presentation at a client computing device of a user a user interface (UI) that comprises a plurality of components;
   receive an indication of a message to the user; automatically modify the user interface to accommodate presentation of an interactive element associated with the message at least in part by automatically modifying one of the components based on a current or target location of the component within the UI with respect to a default position of the interactive element in the UI; and
   automatically provide for presentation the user interface as modified and the interactive element associated with the message.

9. The media of claim 8, wherein the components comprise one or more of the following: a news feed story; an image; text; an interactive element; or a sub-component.

10. The media of claim 8, wherein modifying the component comprises: resizing the component; removing the component from presentation; providing the component for presentation; repositioning the component; or rearranging the component.

11. The media of claim 8, wherein modifying the component comprises modifying a sub-component of the component.

12. The media of claim 11, wherein modifying the sub-component of the component comprises: resizing the sub-component; removing the sub-component from presentation; providing the sub-component for presentation; repositioning the sub-component; or rearranging the sub-component.

13. The media of claim 8, wherein the automatic modification of one or more of the components is non-uniform.

14. The media of claim 8, wherein modifying the component is based on the type of information indicated by the modified component.

15. A system comprising:
one or more processors; and
a memory coupled to the processors comprising instructions executable by the processors, the processors being operable when executing the instructions to:
provide for presentation at a client computing device of a user a user interface (UI) that comprises a plurality of components;
receive an indication of a message to the user;
automatically modify the user interface to accommodate presentation of an interactive element associated with the message at least in part by automatically modifying one of the components based on a current or target location of the component within the UI with respect to a default position of the interactive element in the UI; and
automatically provide for presentation the user interface as modified and the interactive element associated with the message.

16. The system of claim 15, wherein the components comprise one or more of the following: a news feed story; an image; text; an interactive element; or a sub-component.

17. The system of claim 15, wherein modifying a component comprises:
resizing the component;
removing the component from presentation;
providing the component for presentation;
repositioning the component; or
rearranging the component.

18. The system of claim 15, wherein modifying a component comprises modifying a sub-component of the component.

19. The system of claim 15, wherein the automatic modification of one or more of the components is non-uniform.

20. The system of claim 15, wherein modifying the component is based on the type of information indicated by the modified component.

* * * * *